(12) United States Patent

Yi et al.

(10) Patent No.: US 12,589,384 B2
(45) Date of Patent: Mar. 31, 2026

(54) NON-METAL CATALYST FOR SYNTHESIZING POLYCARBONATE BY CO$_2$ AND PREPARATION METHOD THEREFOR

(71) Applicant: Wuhan Institute of Technology, Wuhan (CN)

(72) Inventors: Qun Yi, Wuhan (CN); Lijuan Shi, Wuhan (CN); Mingyue Qiu, Wuhan (CN); Haonan Wu, Wuhan (CN)

(73) Assignee: Wuhan Institute of Technology, Wuhan (CN)

( * ) Notice: Subject to any disclaimer, the term of this patent is extended or adjusted under 35 U.S.C. 154(b) by 494 days.

(21) Appl. No.: 18/210,657

(22) Filed: Jun. 16, 2023

(65) Prior Publication Data

US 2023/0415138 A1 Dec. 28, 2023

(30) Foreign Application Priority Data

Jun. 23, 2022 (CN) .......................... 202210720069.6

(51) Int. Cl.
    *B01J 31/06*     (2006.01)
    *B01J 37/08*     (2006.01)
    *C08G 64/34*     (2006.01)

(52) U.S. Cl.
    CPC .............. *B01J 31/06* (2013.01); *B01J 37/08* (2013.01); *C08G 64/34* (2013.01)

(58) Field of Classification Search
    CPC ... B01J 31/06; B01J 37/08; B01J 31/08; B01J 31/4007; B01J 31/0239; B01J 31/0244; B01J 31/0268; B01J 2231/14; B01J 2231/48; C08G 64/34; C08G 64/0208; Y02P 20/584
    See application file for complete search history.

(56) References Cited

U.S. PATENT DOCUMENTS 4,880,892 A     11/1989   Urano et al.

FOREIGN PATENT DOCUMENTS

| | | | |
|---|---|---|---|
| CN | 104448283 A | * | 3/2015 |
| CN | 107537575 A | | 1/2018 |
| CN | 109364993 A | | 2/2019 |
| JP | 2020132767 A | | 8/2020 |

OTHER PUBLICATIONS

Han Wei-Li, et al., Research Progress of Catalysts for Copolymerization of Carbon Dioxide and Epoxides, Journal of Molecular Catalysis (China), 2017, pp. 575-593, vol. 31, No. 6.

* cited by examiner

*Primary Examiner* — Anthony J Zimmer
*Assistant Examiner* — Jaanzeb C Raja
(74) *Attorney, Agent, or Firm* — Bayramoglu Law Offices LLC

(57) ABSTRACT

A non-metal catalyst for synthesizing polycarbonate by CO$_2$ and a preparation method therefor are provided. The preparation method of the non-metal catalyst includes the following steps: dissolving a hydroxyl functionalized organic ammonium halide monomer, a quaternary phosphonium salt monomer, and a hydroxyl functionalized imidazole salt monomer in a solvent, and polymerizing the mixture under the action of an initiator to obtain the non-metal catalyst for synthesizing the polycarbonate by using CO$_2$. The non-metal catalyst prepared by the present invention is used as a heterogeneous catalytic material, is applied to a system for preparing polycarbonate by a one-step copolymerization reaction of CO$_2$ and an epoxy compound, has high catalytic activity, does not need an additional cocatalyst or a solvent, efficiently converts CO$_2$ into the polycarbonate, has no impurities such as metal in the product, and has the advantages of easy separation, recycling, and the like.

16 Claims, No Drawings

NON-METAL CATALYST FOR SYNTHESIZING POLYCARBONATE BY CO₂ AND PREPARATION METHOD THEREFOR

CROSS REFERENCE TO THE RELATED APPLICATIONS

This application is based upon and claims priority to Chinese Patent Application No. 202210720069.6, filed on Jun. 23, 2022, the entire contents of which are incorporated herein by reference.

TECHNICAL FIELD

The present invention relates to the field of catalytic materials, and in particular to a non-metal catalyst for synthesizing polycarbonate by $CO_2$ and a preparation method therefor.

BACKGROUND

The rapid development of the global economy has brought about climate warming that has become a high-profile environmental issue, and the massive emissions of greenhouse gases, mainly $CO_2$, have led to increasing climate warming in recent years. From the perspective of resource utilization, $CO_2$, as a cheap, non-toxic and abundant C1 resource, can be converted into various high value-added organic chemicals. Meanwhile, in order to limit and reduce the use of plastic bags and curb "white pollution", the National Development and Reform Commission, the Ministry of Ecology and Environment, the Ministry of Commerce, and the like successively issued "plastic restriction/plastic ban orders" in 2020. The polycarbonate is synthesized by reacting $CO_2$ serving as a raw material with an epoxy compound, the utilization rate of reaction atoms is 100%, a completely biodegradable green carbon material can be obtained while $CO_2$ is consumed, and simultaneously, the "carbon neutrality" and "plastic restriction/plastic ban orders" in China are solved.

However, in view of the higher activation energy of the reaction, most of the catalysts used in the current reaction system are metal-based catalysts (such as zinc glutarate and rare earth catalysts), and technical bottlenecks of severe reaction conditions (high temperature ≥100° C., high pressure ≥2 MPa, and long reaction time of 40 h), high cost, more metal residues in products, complicated separation and recovery, and the like are present, so that the development of non-metal catalysts that are cheap and easy to obtain, have high catalytic activity, and strong stability to realize the efficient conversion of $CO_2$/epoxy compounds under mild conditions has become a key core issue for further promoting the development and application of this technology.

SUMMARY

The present invention aims to overcome the defects in the prior art and provides a non-metal catalyst for synthesizing polycarbonate by $CO_2$ and a preparation method therefor, and the obtained non-metal catalyst can be used for the efficient synthesis of polycarbonate.

For the above technical objective, the technical solutions of the present invention are as follows:

According to a first aspect, the present invention provides a preparation method for a non-metal catalyst for synthesizing polycarbonate by $CO_2$, which comprises the following steps: dissolving a hydroxyl functionalized organic ammonium halide monomer, a quaternary phosphonium salt monomer, and a hydroxyl functionalized imidazole salt monomer in a solvent, and polymerizing the mixture under the action of an initiator to obtain the non-metal catalyst for synthesizing the polycarbonate by using $CO_2$.

Further, the hydroxyl functionalized organic ammonium halide monomer is vinyl benzyl trihydroxyethyl ammonium iodide, vinyl benzyl trihydroxyethyl ammonium bromide, or vinyl trihydroxyethyl ammonium bromide.

Further, the quaternary phosphonium salt monomer is vinyl triphenyl phosphonium bromide or vinyl triphenyl phosphonium iodide.

Further, the hydroxyl functionalized imidazole salt monomer is 1-vinyl-3-ethylhydroxyimidazole bromide or 1-vinyl-3-hydroxyimidazole iodide.

Further, a mass ratio of the hydroxyl functionalized organic ammonium halide monomer to the quaternary phosphonium salt monomer to the hydroxyl functionalized imidazole salt monomer is (0.5-4):(0.5-4.5):(0.4-2).

Further, dimethyl sulfoxide is used as the solvent; and an amount of the initiator is 1%-4% of a total mass of the three monomers, and AIBN is used as the initiator.

Further, the polymerization reaction is performed at a temperature of 70-90° C. for 12-48 h.

According to a second aspect, the present invention provides a non-metal catalyst for synthesizing polycarbonate by $CO_2$ prepared by the above preparation method.

According to a third aspect, the present invention provides an application of the non-metal catalyst in the synthesis of polycarbonate by $CO_2$, wherein the synthesis is to synthesize polycarbonate by a one-step copolymerization reaction of $CO_2$ and an epoxy compound.

Further, the epoxy compound is propylene oxide; and the one-step copolymerization reaction is performed at a pressure of 0.1-1 MPa and a temperature of 25-70° C. for 22-26 h.

Compared with the prior art, the present invention has the beneficial effects as follows:

In the method of the present invention, two hydroxyl functionalized organic amine/imidazole salt and one quaternary phosphonium salt are used as raw materials to prepare the metal-base-free heterogeneous organic non-metal catalyst, and the preparation method is simple.

The non-metal catalyst prepared by the present invention is used as a heterogeneous catalytic material, can be applied to a system for preparing polycarbonate by a one-step copolymerization reaction of $CO_2$ and an epoxy compound, has mild reaction conditions and high catalytic activity, does not need an additional cocatalyst or a solvent, efficiently converts $CO_2$ into the polycarbonate, has no impurities such as metal in the product, and has the advantages of easy separation, recycling, and the like. After test, the yield of the catalytic reaction of the non-metal catalyst of the present invention can reach 35%-99%, the selectivity is 82%-99%, and a molecular weight of the prepared polycarbonate is controllable in a range of $1.7 \times 10^4 - 13.9 \times 10^4$ g/mol; the molecular weight distribution is 1.14-2.65, and the distribution is narrow; and the catalytic activity of the catalyst has no significant change after 4 cycles, and a potential method is provided for the industrial utilization of $CO_2$.

Further, compared with the existing catalytic material that is reacted at a high temperature (≥100° C.) and a high pressure (≥2 MPa) for longer time (more than 40 h), the non-metal catalyst synthesized by the present invention can achieve a good catalytic effect under the mild conditions of 0.1-1 MPa, 25-70° C. and reaction time of 22-26 h.

DETAILED DESCRIPTION OF THE EMBODIMENTS

In order to make the objectives, technical solutions and advantages of the present invention more apparent, the present invention is further described in detail below with reference to the examples. It should be understood that the specific embodiments described herein are merely illustrative of the present invention and do not limit the present invention.

Firstly, the preparation method for a non-metal catalyst that is a polymer material provided by the present invention comprises the following steps:

dissolving the hydroxyl functionalized organic ammonium halide monomer to the quaternary phosphonium salt monomer to the hydroxyl functionalized imidazole salt monomer at a mass ratio of (0.5-4):(0.5-4.5):(0.4-2) in a solvent system of dimethyl sulfoxide, and preparing the non-metal catalyst by a one-step copolymerization method under the protection of nitrogen and the action of an initiator AIBN; wherein the one-step copolymerization method comprises: performing reflux reaction at 70%-90° C., polymerizing for 12-48 h to obtain a mesoporous polyionic liquid, precipitating a reaction product by acetone, and drying the product at 110° C. for 48 h to obtain the non-metal catalyst; an amount of the initiator is 0.5%-4% of the total mass of the three monomers, and more preferable 1%-3%; and a ratio of the total mass of the three monomers to a volume of the dimethyl sulfoxide is (2-10) g: 50 mL.

The hydroxyl functionalized organic ammonium halide monomer is vinyl benzyl trihydroxyethyl ammonium iodide [BHA]I, vinyl benzyl trihydroxyethyl ammonium bromide [BHA]Br, or vinyl trihydroxyethyl ammonium bromide [VHA]Br.

The quaternary phosphonium salt monomer is vinyl triphenyl phosphonium bromide [VBP]Br or vinyl triphenyl phosphonium iodide [VBP]I.

The hydroxyl functionalized imidazole salt monomer is 1-vinyl-3-ethylhydroxyimidazole bromide [AVM]Br or 1-vinyl-3-hydroxyimidazole iodide [AVM]I.

Preferably, a molar ratio of the hydroxyl functionalized organic ammonium halide monomer to the quaternary phosphonium salt monomer to the hydroxyl functionalized imidazole salt monomer is 1:(3-15):3.

Secondly, the non-metal catalyst of the present invention is used for catalyzing the one-step copolymerization reaction of $CO_2$ and propylene oxide to synthesize polycarbonate, and comprises the following steps:

taking the non-metal catalyst of the present invention, $CO_2$, and propylene oxide as raw materials, and performing a one-step copolymerization reaction under the conditions at a pressure of 0.1-1 MPa and a temperature of 25-70° C. for 22-26 h to prepare polycarbonate. The mass ratio of the non-metal catalyst to the propylene oxide is (0.4-0.6):1.16.

Preferably, the reaction temperature is 35-70° C., and more preferably 50-70° C.

The reaction for preparing polycarbonate does not need to add an additional cocatalyst, and the catalytic material has a high recycling rate.

Example 1

1.5 g of [BHA]I, 0.6 g of [AVM]Br, and 0.5 g of [VBP]Br were weighed and dissolved in 50 mL of dimethyl sulfoxide, the mixture was added with 0.05 g of AIBN, nitrogen was introduced for protection, and the mixture was heated to 80° C. and reacted for 24 h. After the reaction was completed, the reaction solution was cooled to room temperature and added with acetone to precipitate a product, and the product was centrifuged and dried under vacuum at 110° C. for 48 h to obtain 2.1 g of light yellow solid marked as PBAP-1.

Example 2

3.8 g of [BHA]Br, 1.5 g of [AVM]Br, and 2.5 g of [VBP]Br were weighed and dissolved in 50 mL of dimethyl sulfoxide, the mixture was added with 0.23 g of AIBN, nitrogen was introduced for protection, and the mixture was heated to 80° C. and reacted for 24 h. After the reaction was completed, the reaction solution was cooled to room temperature and added with acetone to precipitate a product, and the product was centrifuged and dried under vacuum at 110° C. for 48 h to obtain 5.8 g of light yellow solid marked as PBAP-2.

Example 3

3.8 g of [BHA]Br, 1.9 g of [AVM]I, and 2.5 g of [VBP]Br were weighed and dissolved in 50 mL of dimethyl sulfoxide, the mixture was added with 0.23 g of AIBN, nitrogen was introduced for protection, and the mixture was heated to 80° C. and reacted for 24 h. After the reaction was completed, the reaction solution was cooled to room temperature and added with acetone to precipitate a product, and the product was washed and centrifuged, and dried under vacuum at 110° C. for 48 h to obtain 6.2 g of light yellow solid marked as PBAP-3.

Example 4

0.76 g of [VHA]Br, 0.41 g of [AVM]I, and 4.1 g of [VBP]I were weighed and dissolved in 50 mL of dimethyl sulfoxide, the mixture was added with 0.09 g of AIBN, nitrogen was introduced for protection, and the mixture was heated to 80° C. and reacted for 24 h. After the reaction was completed, the reaction solution was cooled to room temperature and added with acetone to precipitate a product, and the product was washed and centrifuged, and dried under vacuum at 110° C. for 48 h to obtain 1.9 g of light yellow solid marked as PBAP-4.

Example 5

0.52 g of [VHA]I, 0.41 g of [AVM]I, and 4.1 g of [VBP]I were weighed and dissolved in 50 mL of dimethyl sulfoxide, the mixture was added with 0.09 g of AIBN, nitrogen was introduced for protection, and the mixture was heated to 80° C. and reacted for 24 h. After the reaction was completed, the reaction solution was cooled to room temperature and added with acetone to precipitate a product, and the product was washed and centrifuged, and dried under vacuum at 110° C. for 48 h to obtain 1.9 g of light yellow solid marked as PBAP-5.

The non-metal catalysts obtained in Examples 1 to 5 were characterized by nitrogen desorption, and the results are shown in Table 1 below.

5

TABLE 1

Texture characteristics of different non-metal catalysts

| Sample | Specific surface area $(m^2 \cdot g^{-1})$ | Pore volume $(cm^3 \cdot g^{-1})$ | Average pore diameter (nm) |
|---|---|---|---|
| PBAP-1 | 220 | 1.3 | 21 |
| PBAP-2 | 310 | 1.4 | 20 |
| PBAP-3 | 120 | 0.7 | 21 |
| PBAP-4 | 95 | 0.5 | 17 |
| PBAP-5 | 380 | 1.9 | 17 |

It can be seen from the test data in Table 1 that the non-metal catalyst prepared by the present invention has a specific surface area of 95-310 $m^2 \cdot g^{-1}$, a pore volume of 0.5-1.9 $cm^3 \cdot g^{-1}$, and an average pore diameter of 17-21 nm, which indicates that the prepared material is in a mesoporous structure.

Application Examples 1 to 5: the catalytic performance study of different non-metal catalysts for the reaction of synthesizing polycarbonate by reacting $CO_2$ with propylene oxide, the specific examples are as follows, and the test results are shown in Table 2.

Application Example 1

A non-metal catalyst PBAP-1 (0.5 g) and propylene oxide (1.16 g, 20 mmol) were added in sequence into a 100 mL high-pressure reaction kettle, the mixture was heated to 50° C., $CO_2$ was introduced until the reaction pressure was 1 MPa, and the mixture was reacted for 24 h. The reaction solution was cooled to room temperature, the obtained product was washed with chloroform and centrifuged to obtain a catalyst, and the supernatant was subjected to rotary evaporation and dried to obtain a polycarbonate product. The product was prepared by using deuterated chloroform and then subjected to nuclear magnetic hydrogen spectrum analysis, and the yield of the obtained polycarbonate was 96% and the selectivity was 99%. The molecular weight test of the polycarbonate was performed by using gel chromatography, and the number average molecular weight of the polycarbonate was $2.8 \times 10^4$ g/mol, and the molecular weight distribution was 2.12.

Application Example 2

This application example was the same as in Example 1, the non-metal catalyst selected was PBAP-2 (0.5 g), the reaction temperature was 50° C. and the other conditions were not changed, and the yield of the obtained polycarbonate was 95% and the selectivity was 99%, and the number average molecular weight of the polycarbonate was $9.2 \times 10^4$ g/mol, and the molecular weight distribution was 1.54.

Application Example 3

This application example was the same as in Example 1, the non-metal catalyst selected was PBAP-3 (0.5 g), the reaction temperature was 50° C. and the other conditions were not changed, and the yield of the obtained polycarbonate was 96% and the selectivity was 99%, and the number average molecular weight of the polycarbonate was $8.4 \times 10^4$ g/mol, and the molecular weight distribution was 1.24.

Application Example 4

This application example was the same as in Example 1, the non-metal catalyst selected was PBAP-4 (0.5 g), the reaction temperature was 50° C. and the other conditions were not changed, and the yield of the obtained polycarbonate was 95% and the selectivity was 99%, and the number average molecular weight of the polycarbonate was $7.2 \times 10^4$ g/mol, and the molecular weight distribution was 1.22.

Application Example 5

This application example was the same as in Example 1, the non-metal catalyst selected was PBAP-5 (0.5 g), the reaction temperature was 50° C. and the other conditions were not changed, and the yield of the obtained polycarbonate was 97% and the selectivity was 99%, and the number average molecular weight of the polycarbonate was $11.2 \times 10^4$ g/mol, and the molecular weight distribution was 1.38.

Application Examples 6 to 7: the effect of the reaction temperature on the catalytic performance of the reaction of synthesizing polycarbonate by reacting $CO_2$ with propylene oxide, the specific examples are as follows, and the test results are shown in Table 2.

Application Example 6

This application example was the same as in Example 5, the non-metal catalyst selected was PBAP-5 (0.5 g), the reaction temperature was 25° C. and the other conditions were not changed, and the yield of the obtained polycarbonate was 35% and the selectivity was 82%, and the number average molecular weight of the polycarbonate was $1.7 \times 10^4$ g/mol, and the molecular weight distribution was 2.65.

Application Example 7

This application example was the same as in Example 1, the non-metal catalyst selected was PBAP-5 (0.5 g), the reaction temperature was 70° C. and the other conditions were not changed, and the yield of the obtained polycarbonate was 99/o and the selectivity was 99%, and the number average molecular weight of the polycarbonate was $13.9 \times 10^4$ g/mol, and the molecular weight distribution was 1.14.

TABLE 2

Catalytic performance of non-metal catalysts for the reaction of synthesizing polycarbonate by reacting $CO_2$ with propylene oxide

| Application Example | Non-metal catalyst | Temperature (° C.) | Pressure (MPa) | Yield (%) | Selectivity (%) | Polycarbonate Molecular weight ($\times 10^4$, g/mol) | Molecular weight Distribution |
|---|---|---|---|---|---|---|---|
| 1 | PBA-1 | 50 | 1 | 96 | 99 | 2.8 | 2.12 |
| 2 | PBA-2 | 50 | 1 | 95 | 99 | 9.2 | 1.54 |
| 3 | PBA-3 | 50 | 1 | 96 | 99 | 8.4 | 1.24 |
| 4 | PBA-4 | 50 | 1 | 95 | 99 | 7.2 | 1.22 |
| 5 | PBA-5 | 50 | 1 | 97 | 99 | 11.2 | 1.38 |
| 6 | PBA-5 | 25 | 1 | 35 | 82 | 1.7 | 2.65 |
| 7 | PBA-5 | 70 | 1 | 99 | 99 | 13.9 | 1.14 |

It can be seen from the results of Table 2 that the non-metal catalyst of the present invention has high catalytic activity, and can be applied to the reaction of synthesizing polycarbonate by reacting $CO_2$ and propylene oxide without a cocatalyst, the yield can reach 35-99%, the selectivity is 82-99%, and the molecular weight of the prepared polycarbonate is $1.7 \times 10^4$-$13.9 \times 10^4$ g/mol; the molecular weight distribution is 1.14-2.65.

Application Example 8: Recycling Performance of Non-Metal Catalyst

The non-metal catalyst collected by centrifugation after the reaction in Application Example 5 was washed with $CHCl_6$ (5 mL×3), dried under vacuum at 80° C. and repeatedly used. The procedure was the same as in Application Example 5. The recycling results are shown in Table 3.

TABLE 3

Catalytic recycle of non-metal catalyst PBAP-5

| | | | | | Polycarbonate | |
| Number of recycling | Temperature (° C.) | Pressure (MPa) | Yield (%) | Selectivity (%) | Molecular weight (×$10^4$, g/mol) | Molecular weight Distribution |
| --- | --- | --- | --- | --- | --- | --- |
| 1 | 50 | 1 | 96 | 99 | 11.0 | 1.35 |
| 2 | 50 | 1 | 95 | 99 | 11.3 | 1.37 |
| 3 | 50 | 1 | 97 | 99 | 10.8 | 1.25 |
| 4 | 50 | 1 | 95 | 99 | 11.2 | 1.34 |

It can be seen from the above that the yield of the catalytic reaction of the non-metal catalyst synthesized by the present invention under mild conditions (50° C., 1 MPa) can reach 97%, the molecular weight of the polycarbonate is controllable within a range of $1.7 \times 10^4$-$13.9 \times 10^4$ g/mol, and the molecular weight distribution is narrow. Compared with the conventional metal-based catalysts (such as zinc glutarate and rare earth catalysts), the catalyst synthesized by the present invention does not contain metal, so that the cost is reduced, and the quality of a polycarbonate product (less metal residue) can be better ensured. In addition, most of the catalytic materials reported at present still need high temperature ($\geq 100$° C.), high pressure ($\geq 2$ MPa) and long reaction time (40 h) for realizing high-efficiency catalytic conversion of $CO_2$. The non-metal catalyst synthesized by the present invention can achieve a good catalytic effect under mild conditions (50° C., 1 MPa), and the catalytic activity of the non-metal catalyst is not significantly changed after the non-metal catalyst is recycled.

Therefore, the present invention provides a non-metal-base polymer non-metal catalyst and a preparation method therefor, the adopted raw materials are two hydroxyl functionalized organic amine/imidazole salts and one quaternary phosphonium salt, and the preparation method is simple, so as to realize the preparation of polycarbonate by the reaction of high-efficiency catalytic conversion of $CO_2$ and propylene oxide under the conditions of mild conditions, no solvent and no additional cocatalyst. The present invention synthesizes the polycarbonate by one-step copolymerization of an epoxy compound and $CO_2$ that is used as a raw material, has the advantages of high activity, no need for a cocatalyst, no metal and the like, can obtain the completely biodegradable green carbon material while consuming $CO_2$, and simultaneously solves the problems of "carbon neutrality" and "plastic restriction/plastic ban orders" in China. The copolymerization reaction between propylene oxide and $CO_2$ by the non-metal catalyst is a method for converting $CO_2$ with industrial application potential.

The specific embodiments of the present invention described above do not constitute a limitation to the protection scope of the present invention. Any other corresponding changes and modifications made according to the technical concept of the present invention should be included in the protection scope of the claims of the present invention.

What is claimed is:

1. A preparation method for a non-metal catalyst for synthesizing polycarbonate by $CO_2$, comprising the following steps: dissolving a hydroxyl functionalized organic ammonium halide monomer, a quaternary phosphonium salt monomer, and a hydroxyl functionalized imidazole salt monomer in a solvent to obtain a mixture, and polymerizing the mixture under an action of an initiator to obtain the non-metal catalyst for synthesizing the polycarbonate by using the $CO_2$.

2. The preparation method for the non-metal catalyst for synthesizing the polycarbonate by the $CO_2$ according to claim 1, wherein the hydroxyl functionalized organic ammonium halide monomer is vinyl benzyl trihydroxyethyl ammonium iodide, vinyl benzyl trihydroxyethyl ammonium bromide, or vinyl trihydroxyethyl ammonium bromide.

3. The preparation method for the non-metal catalyst for synthesizing the polycarbonate by the $CO_2$ according to claim 1, wherein the quaternary phosphonium salt monomer is vinyl triphenyl phosphonium bromide or vinyl triphenyl phosphonium iodide.

4. The preparation method for the non-metal catalyst for synthesizing the polycarbonate by the $CO_2$ according to claim 1, wherein the hydroxyl functionalized imidazole salt monomer is 1-vinyl-3-ethylhydroxyimidazole bromide or 1-vinyl-3-hydroxyimidazole iodide.

5. The preparation method for the non-metal catalyst for synthesizing the polycarbonate by the $CO_2$ according to claim 1, wherein a mass ratio of the hydroxyl functionalized organic ammonium halide monomer to the quaternary phosphonium salt monomer to the hydroxyl functionalized imidazole salt monomer is (0.5-4):(0.5-4.5):(0.4-2).

6. The preparation method for the non-metal catalyst for synthesizing the polycarbonate by the $CO_2$ according to claim 1, wherein dimethyl sulfoxide is used as the solvent; and an amount of the initiator is 1%-4% of a total mass of the hydroxyl functionalized organic ammonium halide monomer, the quaternary phosphonium salt monomer, and the hydroxyl functionalized imidazole salt monomer, and AIBN is used as the initiator.

7. The preparation method for the non-metal catalyst for synthesizing the polycarbonate by the $CO_2$ according to claim 1, wherein the polymerizing is performed at a temperature of 70-90° C. for 12-48 h.

8. A non-metal catalyst for synthesizing polycarbonate by $CO_2$ prepared by the preparation method according to claim 1.

9. A method of an application of the non-metal catalyst according to claim 8 in a synthesis of the polycarbonate by the $CO_2$, wherein the synthesis is to synthesize the polycarbonate by a one-step copolymerization reaction of the $CO_2$ and an epoxy compound.

10. The method of the application according to claim 9, wherein the epoxy compound is propylene oxide; and the one-step copolymerization reaction is performed at a pressure of 0.1-1 MPa and a temperature of 25-70° C. for 22-26 h.

11. The non-metal catalyst according to claim 8, wherein the hydroxyl functionalized organic ammonium halide monomer is vinyl benzyl trihydroxyethyl ammonium iodide, vinyl benzyl trihydroxyethyl ammonium bromide, or vinyl trihydroxyethyl ammonium bromide.

12. The non-metal catalyst according to claim 8, wherein the quaternary phosphonium salt monomer is vinyl triphenyl phosphonium bromide or vinyl triphenyl phosphonium iodide.

13. The non-metal catalyst according to claim 8, wherein the hydroxyl functionalized imidazole salt monomer is 1-vinyl-3-ethylhydroxyimidazole bromide or 1-vinyl-3-hydroxyimidazole iodide.

14. The non-metal catalyst according to claim 8, wherein a mass ratio of the hydroxyl functionalized organic ammonium halide monomer to the quaternary phosphonium salt monomer to the hydroxyl functionalized imidazole salt monomer is (0.5-4):(0.5-4.5):(0.4-2).

15. The non-metal catalyst according to claim 8, wherein dimethyl sulfoxide is used as the solvent; and an amount of the initiator is 1%-4% of a total mass of the hydroxyl functionalized organic ammonium halide monomer, the quaternary phosphonium salt monomer, and the hydroxyl functionalized imidazole salt monomer, and AIBN is used as the initiator.

16. The non-metal catalyst according to claim 8, wherein the polymerizing is performed at a temperature of 70-90° C. for 12-48 h.

* * * * *